(12) United States Patent
Chew

(10) Patent No.: US 6,211,648 B1
(45) Date of Patent: Apr. 3, 2001

(54) BATTERY PACK FOR PORTABLE COMPUTER

(75) Inventor: Anthony Kwan Wee Chew, Singapore (SG)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/498,137

(22) Filed: Feb. 4, 2000

(30) Foreign Application Priority Data

Mar. 5, 1999 (SG) ................................................ 9901295-7

(51) Int. Cl.[7] .................................................. H01M 10/46
(52) U.S. Cl. ............................................................ 320/112
(58) Field of Search ..................................... 320/107, 110, 320/112; 439/96, 100; D13/103

(56) References Cited

U.S. PATENT DOCUMENTS 5,455,737 * 10/1995 Ogami et al. .
5,578,391 * 11/1996 Meyers et al. .
5,697,070 * 12/1997 Liebler .
5,841,630 * 11/1998 Seto et al. .

* cited by examiner

Primary Examiner—Edward H. Tso

(57) ABSTRACT

An elongate battery pack for removable attachment to a portable computer. The battery pack includes guides at each end surface which enable the battery to be attached in a lateral fashion to the computer, and locked in place by a separate mechanical latch mechanism. One of the guides is modified to include a catch which, during attachment of the battery pack to the computer, engages a complementary guide on the computer to locally restrain that end of the battery.

10 Claims, 6 Drawing Sheets

BATTERY PACK FOR PORTABLE COMPUTER

This invention relates to a battery pack for removable attachment to a portable computer.

FIG. 1 illustrates a known portable computer 1 that uses a removable battery pack 2 to provide electrical power to circuitry and devices of the computer, such as for example a central microprocessor, a memory module and an LCD display. The battery pack 2 comprises an elongate housing enclosing a series of battery cells and is shown in FIG. 1 detached or removed from the portable computer 1. A pair of guide slots 110, 115 are located at opposite end surfaces of the battery pack housing. During attachment of the battery pack to the portable computer, the guide slots are aligned and slidingly cooperate with a pair of complementary rails 120, 125 located in a battery-receiving cavity 130 of the computer. In this way, the battery is slid or translated towards the computer in a lateral fashion during attachment.

The battery pack 1 is secured in place by a simple mechanical latch arrangement in the form of a sprung barb on the computer which engages complementary retention means on the battery pack. The retention means are implemented on a raised portion 135 depending from a side surface of the battery pack, whilst the sprung barb is implemented in a recess 140 in the battery-receiving cavity. The recess is designed to accommodate the raised portion during attachment of the battery pack so that the sprung barb and the retention means correctly latch. Subsequent removal of the battery pack is achieved by a user releasing the mechanical latch and sliding the battery pack out of the battery-receiving cavity. The mechanical latch is released by means of a sliding button 145 which moves the sprung barb out of engagement with the retention means on the battery pack.

A battery attachment arrangement similar to that shown in FIG. 1 is employed in the Libretto 20CT portable computer, available from Toshiba, Japan. A drawback with this battery attachment arrangement is that the battery has a tendency to pivot or rock about the centrally-positioned mechanical latch. In other words, the ends of the battery pack remain loose even when the battery is secured with the mechanical latch.

FIG. 2 illustrates another known portable computer 1 that uses a removable battery pack 2 to supply power to the computer. The battery pack is attached to the portable computer using a modified version of the aforementioned battery attachment arrangement of FIG. 1. In this version, the single, centrally-positioned mechanical latch is replaced by a pair of spaced-apart mechanical latches. Accordingly, the battery-receiving cavity 130 now includes two recesses 210, 215 that are designed to accommodate two raised portions 220, 225 on the side of the battery pack. The pair of mechanical latches are positioned so that once attached, the battery pack is secured towards each end. Thus, the ends of the battery pack are held more firmly and there is less tendency for the battery pack to pivot or rock. The user-actuable slide button 145 in FIG. 2 is simultaneously linked to a barb of each mechanical latch, thereby allowing a user to release the pair of latches in a single operation. A battery attachment arrangement similar to that shown in FIG. 2 is employed in the Cassiopeia A-51 portable computer, available from Casio, Japan.

Unfortunately, the two latch design of FIG. 2 has a drawback when compared to the single latch design of FIG. 1. The two latches not only impose increased material and production costs but they also occupy extra space in the computer. This is particularly undesirable for portable computers where cost and size are sensitive factors to consumers.

According to the present invention there is provided an elongate battery pack for removable attachment to a portable computer. The battery pack includes guides at each end surface which enable the battery to be attached in a lateral fashion to the computer, and locked in place by a separate mechanical latch mechanism. One of the guides is modified to include a catch which, during attachment of the battery pack to the computer, engages a complementary guide on the computer to locally restrain that end of the battery.

According to another aspect of the present invention there is provided a battery pack for removable attachment to a portable computer, comprising an elongate housing including a side-surface and first and second opposing end-surfaces, latch means associated with the side-surface, and respective first and second guide means associated with the first and second opposing end surfaces, in which, during attachment of the battery pack to the computer, the first and second guide means cooperate respectively with first and second complementary guides on the computer in order to guide the battery pack in a lateral direction towards the computer whereby the latch means engage with complementary latch means on the computer to lock the battery pack to the computer, wherein the first guide means of the battery pack further comprises a catch which, during attachment of the battery pack to the computer, engages the first complementary guide to locally restrain the first guide means at a predetermined position.

A battery pack in accordance with the invention has the advantage that it enables the ends portions of the battery pack to be held firmly in place using a simple single-latch design. Thus, compared to previous single-latch designs, there is less tendency for a battery pack in accordance with the invention to pivot or rock.

Preferably, the guide means on the battery pack enable the battery to be slid in a lateral manner towards and away from the portable computer. The guide means may be formed by one or more protrusions extending from the end-surfaces of the battery pack. Ideally, these protrusions are ribs which slide in complementary channels or grooves formed on inward facing surfaces of the portable computer housing. Alternatively, channels or grooves may be formed on the end surfaces of the battery pack for cooperation with protrusions on the portable computer housing. Furthermore, the guides and guide means may be provided by multiple protrusions or channels.

Suitably, the catch of the first guide is formed by an indent on the rib which is designed to be engaged by a projection in the guide channel on the portable computer. Alternatively, this arrangement may be reversed such that the catch is formed by a projection on the rib which is designed to engage an indent in the channel.

Embodiments of the invention will now be described, by way of example, with reference to the accompanying drawings, in which.

Figure 1:
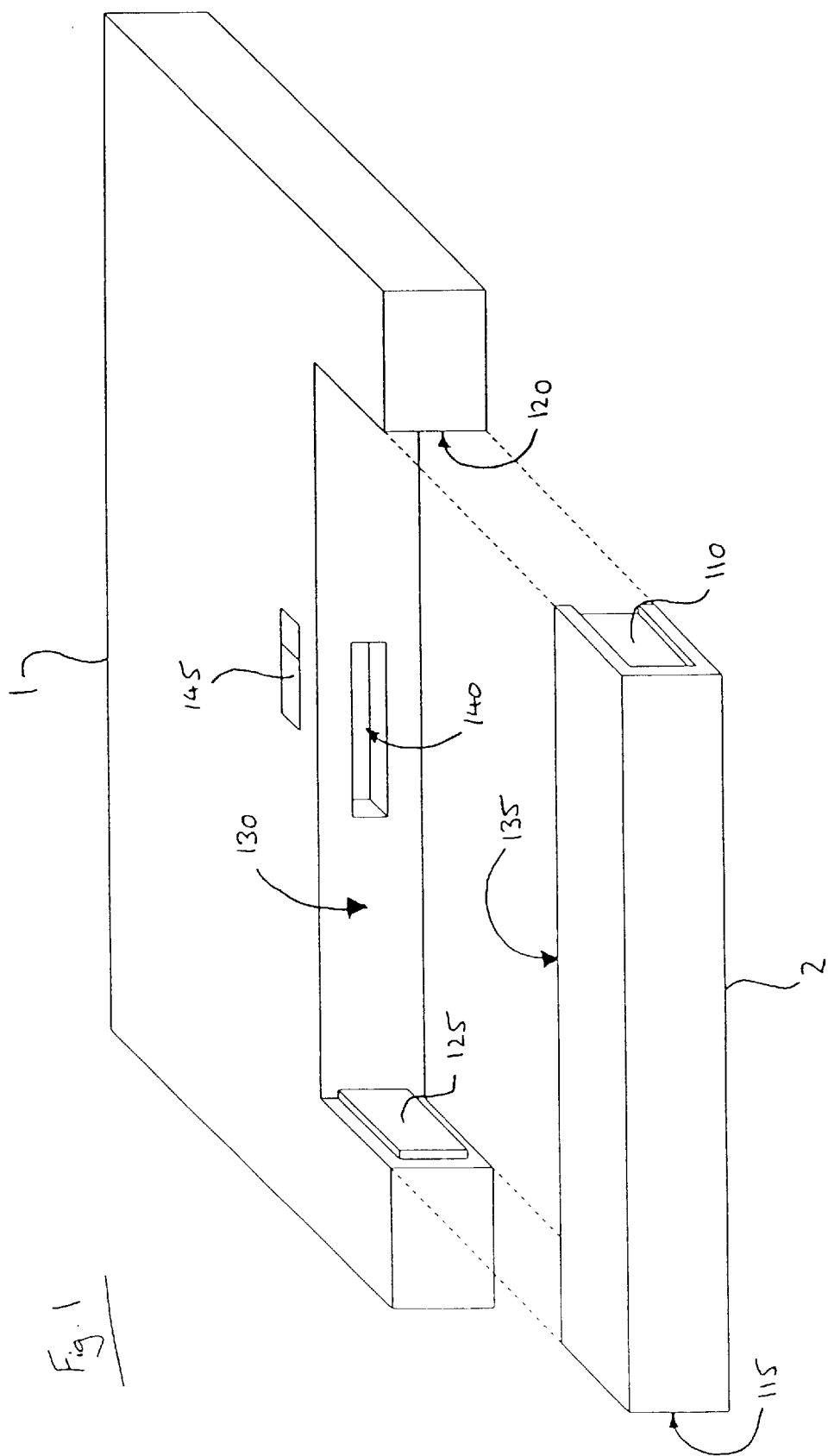
FIG. 1 is a perspective view of known portable computer and a removable battery pack which is attachable to the computer using a single latch design.
Figure 2:
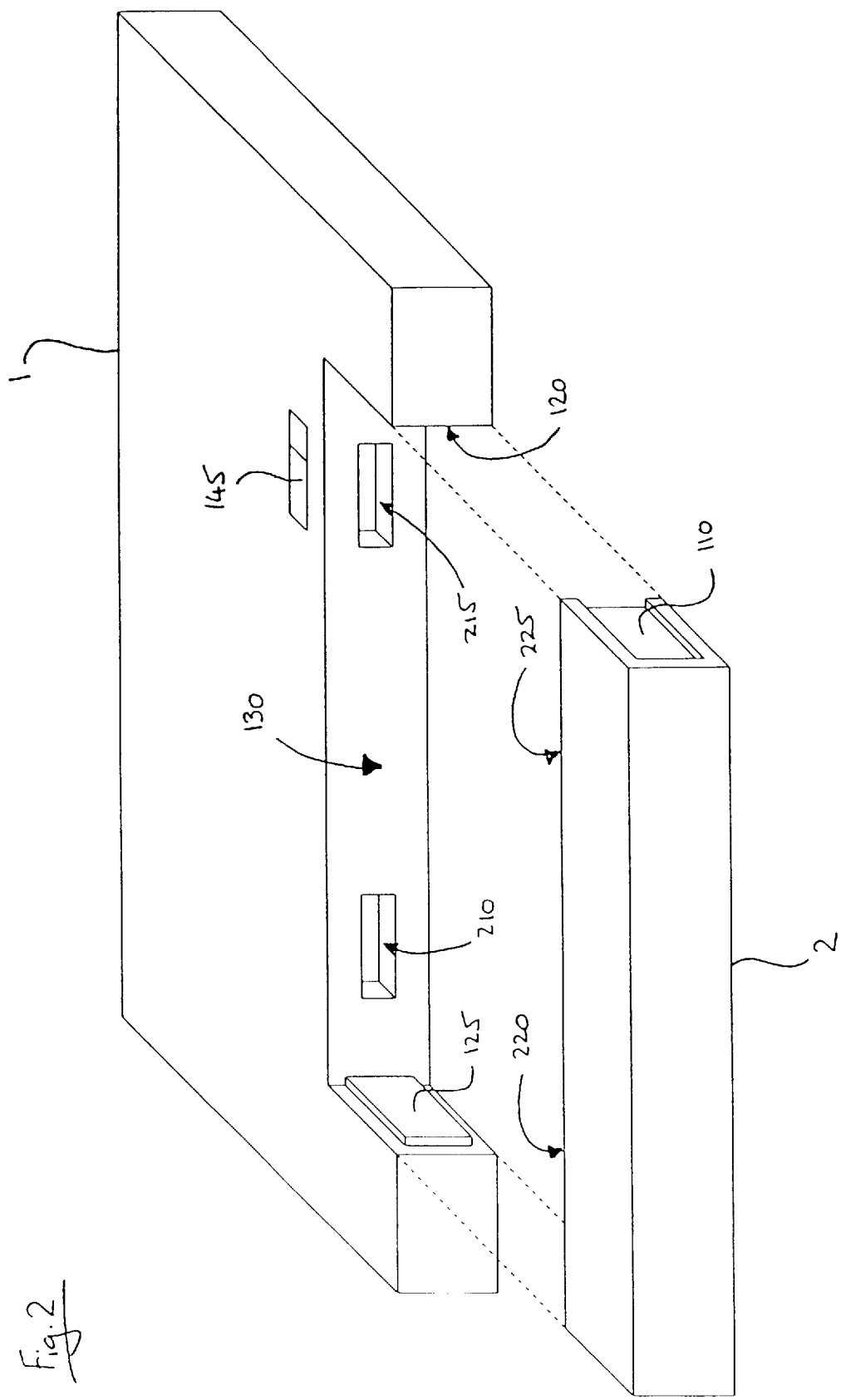
FIG. 2 is a perspective view of a known portable computer and a removable battery pack which is attachable to the computer using a dual latch design.
Figure 3:
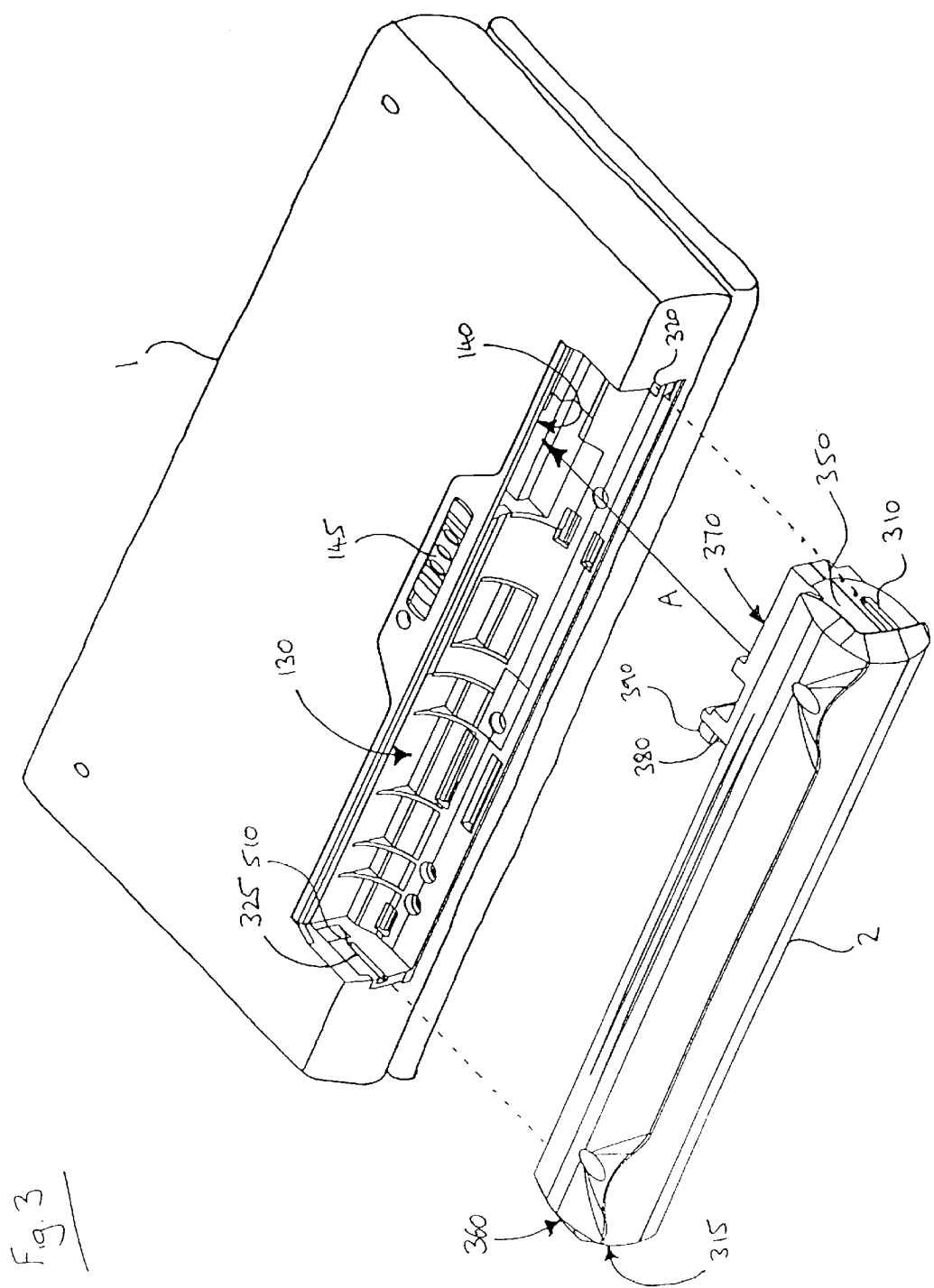
FIG. 3 is a perspective view of a portable computer and a removable battery pack in accordance with the invention.

FIG. 3 illustrates a battery pack 2 in accordance with the invention which can be removably attached to a portable computer 1 to provide electrical power to circuitry and devices of the computer. The portable computer 1 includes a battery-receiving cavity 130 which is configured to receive the battery pack in the direction indicated generally by arrow A.

Figure 4:
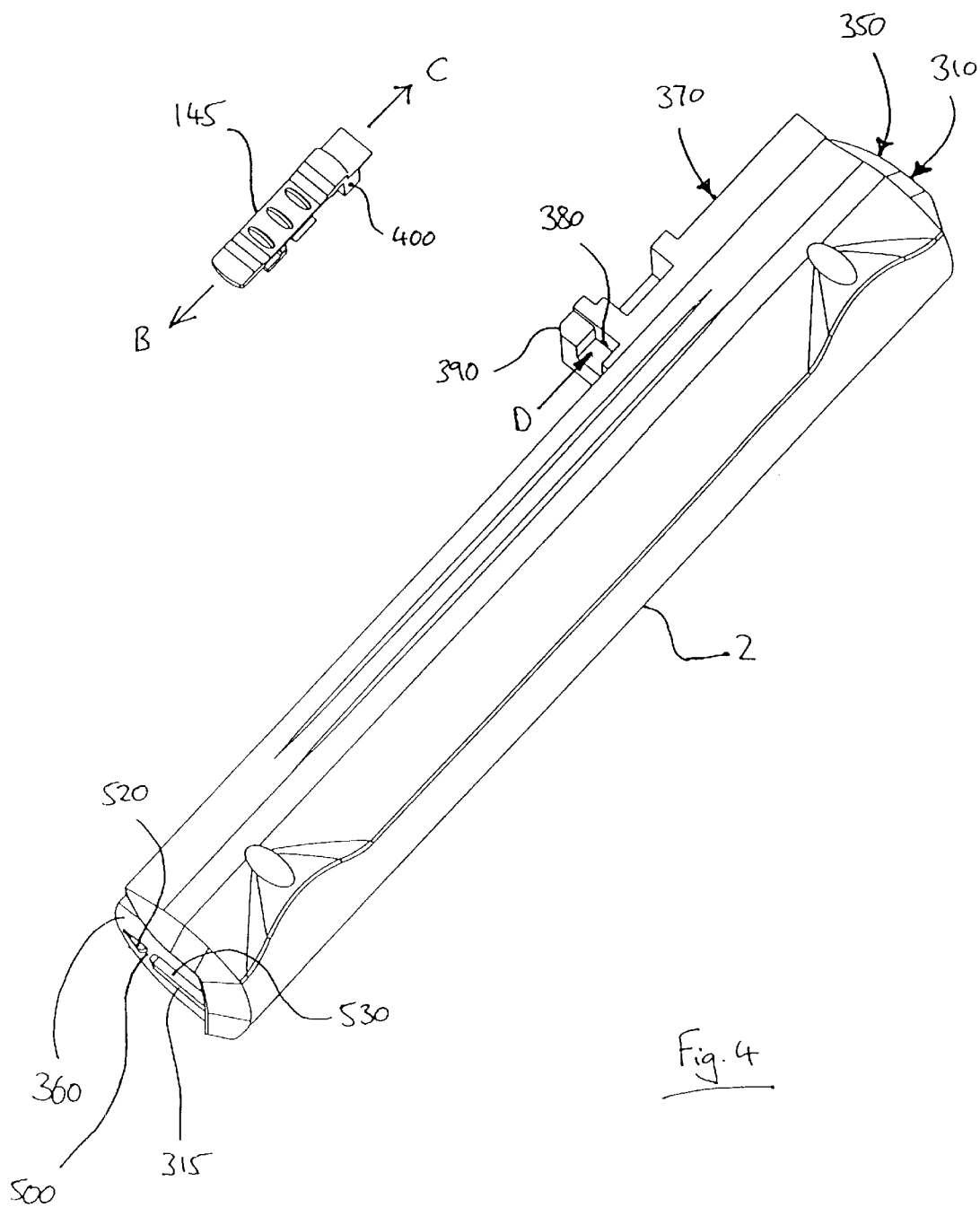
FIG. 4 is a perspective view of the removable battery pack of FIG. 3 and part of a latch mechanism.
Figure 5:
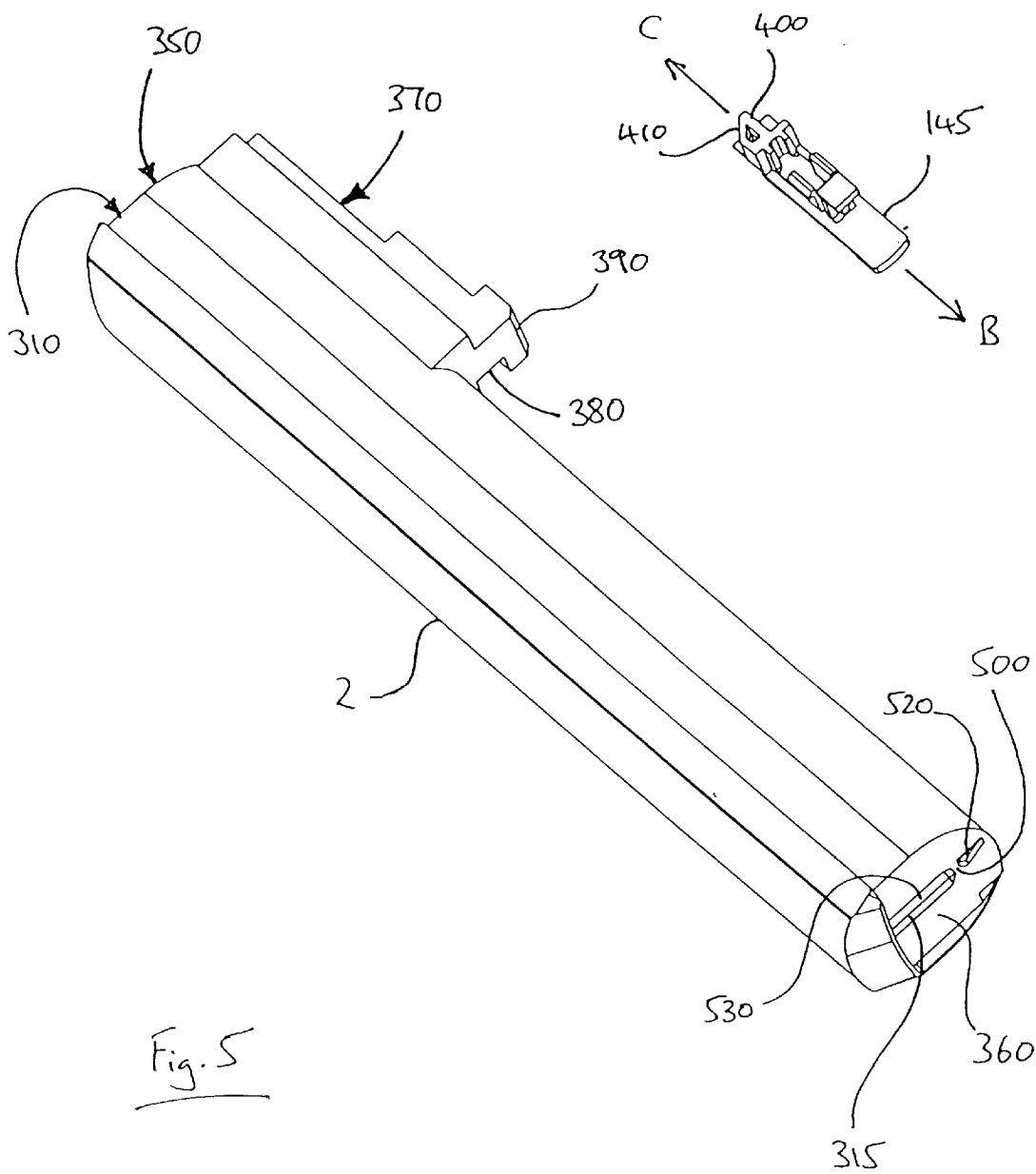
FIG. 5 is a perspective view of the battery pack of FIG. 4 from a different viewing angle.

Referring also to FIGS. 4 and 5, the battery pack 2 comprises an elongate housing enclosing a series of battery cells, such as two serially coupled AA-size battery cells. The housing is constructed from two plastic sections which are joined together by, for example, snap fitting or adhesive. The housing is generally cylindrical in shape and comprises two opposing end-surfaces 350, 360 that are separated by a continuous, curved side-surface. A pair of guide ribs 310, 315 depend respectively from the two end-surfaces 350, 360 of the battery pack housing. These guide ribs 310, 315 cooperate (as shown by the dashed lines in FIG. 3) with respective and complementary channels 320, 325 in the battery-receiving cavity 130. This cooperation of the guide ribs and the channels restricts the movement of the battery pack during insertion to a lateral sliding translation.

The housing of the battery pack 2 further comprises a raised portion 370 extending from a section of the side-surface adjacent one of the end-surfaces 350. A complementary-shaped recess 140 is provided in the cavity 130 of the computer 1 to accommodate the raised portion 370 of the battery pack when the battery is attached to the computer 1. Two functions are served by insertion of the raised portion 370 into the recess 140.

A first function is to physically and electrically couple power contacts of the battery pack, which are disposed on the raised portion, to power contacts of the computer which are disposed in the recess 140. Any suitable form of physical and electrical coupling known to those skilled in the art may be used, such as for example, male and female electrical connectors, or sprung metallic fingers cooperating with metallic plates.

A second function is to provide a mechanical latch arrangement for locking the battery in place once it is attached to the computer. In the current preferred embodiment, the latch arrangement is in the form of a sprung barb 400 (see FIGS. 4 and 5) located in the recess 140 of the computer which is designed to engage in a complementary recess 380 on the raised portion 370 of the battery pack. During insertion of the battery pack, the raised portion 370 is forced against the barb 400 of the computer. A bevelled leading edge 390 of the raised portion 390 acts on an angled surface 400 of the barb 400 to displace the barb in a direction B against a spring bias. Further insertion of the battery pack results in the barb dropping into the complementary recess 380 of the raised portion under the action of the spring as indicated by arrow D in FIG. 4. With the barb in this state, the battery becomes locked in place.

The barb 400 of the latch arrangement is formed unitarily with a release button 145. The spring bias referred to previously is applied to the release button and hence the barb 400 in a known way using, for example, a helical spring. The release button 145 is partly exposed on an outer surface of the computer in order to be actuable when the battery pack is attached to the computer. The button 145 and the barb 400 may be slid in the direction of arrow B to disengage the barb 400 out of the complementary recess 380 and thus unlock the battery pack.

Figure 6:
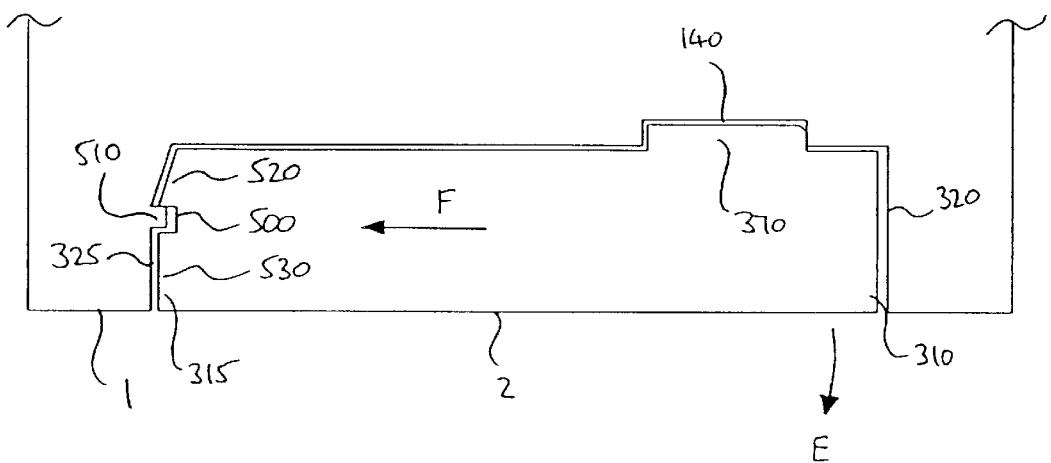
FIG. 6 is a schematic plan view of the battery pack of FIG. 3 attached to the portable computer.

In accordance with the invention, the guide rib 315 that is located at the opposite end of the battery pack from the raised portion 370 includes a notch or indent 500. The indent is designed to interact with a protrusion 510 in the channel 325 of the computer (see FIGS. 3 and 6). During insertion of the battery pack into the cavity of the computer, the guide rib 315 slides in the channel 325 until a leading portion 520 of the guide rib 315 contacts the protrusion 510. Continued insertion of the battery pack urges the leading portion 520 past the protrusion 510 so that the protrusion lies in the indent 500. With the raised portion 370 simultaneous received in the recess 140 of the computer 1, the battery pack is now attached to the computer, as shown schematically in FIG. 6.

In the attached state, the location of the raised portion 370 in the recess 140 urges the battery pack in the axial direction (indicated by arrow F) that provides more positive engagement between the protrusion 510 and the indent 500. In this state, the guide rib 315 is restrained from moving within the channel 325. Hence, the indent behaves like a catch which, during attachment of the battery pack to the computer, engages the complementary guide 325 to locally restrain the guide rib 315 at a predetermined position relative to the complementary guide 325.

Figure 7:
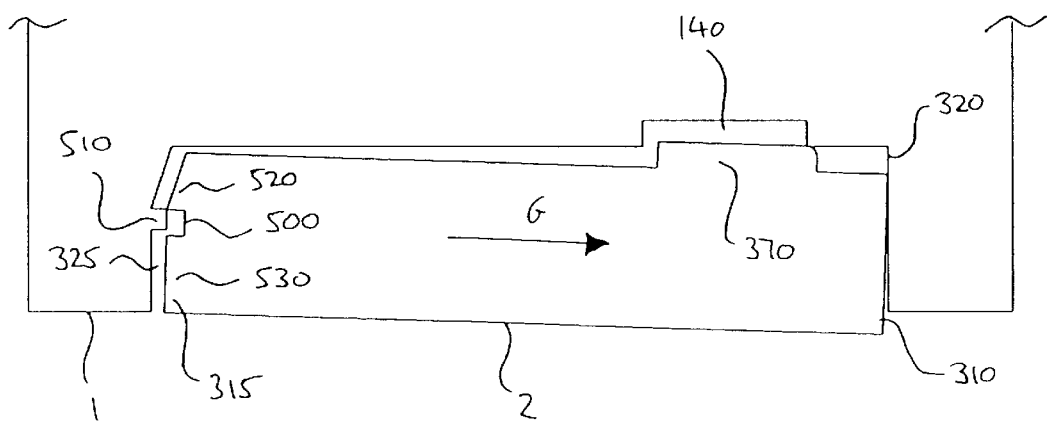
FIG. 7 is a schematic plan view similar to FIG. 6 with the battery pack partially removed from the portable computer.

When it is desired to remove the battery pack from the computer, the release button 145 is slid in the direction of arrow B to disengage the barb 400 from the raised portion of the battery pack. Mechanical tolerances in the guides enable the battery pack to be guided away from the computer at the end proximal the raised portion, whilst the opposite end remains restrained (as indicated by the arrow E in FIG. 6). As the raised portion 140 is removed from the recess 140, the urging action which forced the battery pack in the axial direction F is removed. With reference to FIG. 7, the battery pack may now move slightly in the opposite axial direction indicated by arrow G, thereby releasing the engagement between the protrusion 510 and the indent 500. The battery pack may now be guided out of the battery-receiving cavity 130 of the computer to a removed position. Alternatively, once the barb 400 is disengaged from the raised portion, the battery pack may simply be guide out of the battery-receiving cavity 130 using sufficient force to overcome the restraining action of the protrusion 510 and indent 500 engagement.

It will be evident in view of the foregoing description that various modifications may be made within the scope of the present invention. For example, the latching mechanism may be provided by a movable barb 400 on the raised portion of the battery pack cooperating with a retaining recess 380 in the recess 140 of the computer. Also, references to a portable computer are intended to include any electronic devices having computational capabilities.

What is claimed is:

1. A battery pack for removable attachment to a portable computer, comprising an elongate housing including a side-surface and first and second opposing end-surfaces, latch means associated with the side-surface, and respective first and second guide means associated with the first and second opposing end surfaces, in which, during attachment of the battery pack to the computer, the first and second guide means cooperate respectively with first and second complementary guides on the computer in order to guide the battery pack in a lateral direction towards the computer whereby the latch means engage with complementary latch means on the computer to lock the battery pack to the computer, wherein the first guide means of the battery pack further comprises a catch which, during attachment of the battery pack to the computer, engages the first complementary guide to locally restrain the first guide means at a predetermined position.

2. A battery pack as claimed in claim 1, wherein the first guide means comprises a protrusion extending from the first end-surface of the battery pack for sliding in a channel of the first complementary guide on the computer.

3. A battery pack as claimed in claim 2, wherein the protrusion is in the form of a rib.

4. A battery pack as claimed in claim 3, wherein the catch of the first guide is formed by an indent in the rib which is designed to engage with a projection in said channel.

5. A battery pack as claimed in claim 1, wherein the second guide means comprises a protrusion extending from the second end-surface of the battery pack for sliding in a channel of the second complementary guide on the computer.

6. A battery pack as claimed in claim 5, wherein the protrusion of the second guide means is in the form of a rib.

7. A battery pack as claimed in claim 1, wherein the latch means comprises a recess in the housing of the battery pack which is designed to accommodate a barb of the complementary latch means of the computer.

8. A battery pack as claimed in claim 1, wherein the housing includes a raised portion depending from the side-surface.

9. A battery pack as claimed in claim 8, wherein the latch means is disposed on said raised portion.

10. A battery pack as claimed in any one of the preceding claims, wherein the latch means is disposed towards the second end-surface of the battery pack.

\* \* \* \* \*